United States Patent
Schmidt et al.

(10) Patent No.: US 10,743,184 B2
(45) Date of Patent: Aug. 11, 2020

(54) UNEQUAL TRANSMITTER AND RECEIVER DISTRIBUTION IN DISTRIBUTED ANTENNA SYSTEMS

(71) Applicant: CommScope Technologies LLC, Hickory, NC (US)

(72) Inventors: Nelson Christian Schmidt, Lexington, VA (US); Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 64 days.

(21) Appl. No.: 15/831,226

(22) Filed: Dec. 4, 2017

(65) Prior Publication Data

US 2018/0103377 A1 Apr. 12, 2018

Related U.S. Application Data

(63) Continuation of application No. 14/694,191, filed on Apr. 23, 2015, now Pat. No. 9,838,880.

(60) Provisional application No. 61/983,672, filed on Apr. 24, 2014.

(51) Int. Cl.
*H04W 16/02* (2009.01)
*H04W 88/08* (2009.01)

(52) U.S. Cl.
CPC .......... *H04W 16/02* (2013.01); *H04W 88/085* (2013.01)

(58) Field of Classification Search
CPC .... H04W 16/02; H04W 88/085; H04B 7/024; H04B 7/026
See application file for complete search history.

(56) References Cited

U.S. PATENT DOCUMENTS

| | | | |
|---|---|---|---|
| 2011/0164697 A1 | 7/2011 | Liao et al. | |
| 2012/0134279 A1 | 5/2012 | Tamaki | |
| 2012/0329523 A1* | 12/2012 | Stewart | H03F 1/3247 455/562.1 |
| 2013/0095873 A1 | 4/2013 | Soriaga et al. | |
| 2014/0024402 A1 | 1/2014 | Singh | |
| 2014/0031049 A1 | 1/2014 | Sundaresan et al. | |
| 2014/0269547 A1 | 9/2014 | Valliappan et al. | |
| 2014/0269859 A1 | 9/2014 | Hanson et al. | |
| 2015/0016441 A1 | 1/2015 | Hanson et al. | |

(Continued)

OTHER PUBLICATIONS

U.S. Patent and Trademark Office, "Final Office Action," from U.S. Appl. No. 14/694,191 dated May 25, 2017, pp. 1-14, Published in: US.

(Continued)

*Primary Examiner* — Paul H Masur
(74) *Attorney, Agent, or Firm* — Fogg & Powers LLC

(57) ABSTRACT

Certain features relate to unequal distribution of transmitters and receivers in a distributed antenna system (DAS). Remote units in the DAS can be configured as transmitting remote units, receiving remote units, or remote transceiver units that can transmit and receive wireless signals. In some configurations, the DAS can be configured with a greater number of transmitting remote units than receiving remote units. In other configurations, the DAS can be configured with a greater number of receiving remote units. In some aspects, unequal distribution of transmitters and receivers can be obtained by allocation of transmission frequencies and receiver frequencies in the DAS.

14 Claims, 12 Drawing Sheets

(56) References Cited

U.S. PATENT DOCUMENTS

2015/0087329 A1    3/2015   Stratford et al.
2015/0249513 A1    9/2015   Schwab et al.
2015/0373722 A1   12/2015   Lange

OTHER PUBLICATIONS

U.S. Patent and Trademark Office, "Notice of Allowance," from U.S. Appl. No. 14/694,191 dated Aug. 2, 2017, pp. 1-9, Published in: US.

U.S. Patent and Trademark Office, "Office Action," from U.S. Appl. No. 14/694,191 dated Jan. 6, 2017, pp. 1-27, Published in: US.

\* cited by examiner

UNEQUAL TRANSMITTER AND RECEIVER DISTRIBUTION IN DISTRIBUTED ANTENNA SYSTEMS

CROSS-REFERENCE TO RELATED APPLICATION

This application is a continuation of U.S. patent application Ser. No. 14/694,191, filed Apr. 23, 2015, and titled "Unequal Transmitter and Receiver Distribution in Distributed Antenna System," now Issued U.S. Pat. No. 9,838,880, which claims priority to U.S. Provisional Application Ser. No. 61/983,672, filed Apr. 24, 2014, and titled "Unequal Transmitter and Receiver Distribution in Distributed Antenna System," the contents of all of which are incorporated herein by reference.

BACKGROUND

A telecommunications system, such as a distributed antenna system (DAS), can include one or more central units and multiple remote units coupled to each central unit. A DAS can be used to extend wireless coverage in an area. Central units can be coupled to one or more base stations that can each manage wireless communications for different cell sites. Central units can be controllers that perform the role of, or are coupled to, base stations, as well as provide other control and signal distribution functions. A central unit can receive downlink signals from the base station and distribute downlink signals in analog or digital form to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the central unit. The central unit can transmit uplink signals to the serving base stations.

SUMMARY

In one aspect, a distributed antenna system is provided. The distributed antenna system can include a first set of remote units configured for transmitting wireless signals in a coverage area. The distributed antenna system can also include a second set of remote units configured for receiving wireless signals from the coverage area. The number of the first set of remote units is different from the number of the second set of remote units. The distributed antenna system can also include a central unit configured for communicatively coupling to the first set of remote units and the second set of remote units. The central unit is also configured for communicatively coupling to a base station.

In another aspect, a distributed antenna system is provided. The distributed antenna system can include a central unit configured for communicatively coupling to a first set of remote units and a second set of remote units. The central unit also supports one or more transmitting bands and one or more receiving bands. The first set of remote units can be configured to utilize a first subset of the transmitting bands. The second set of units can be configured to utilize a second subset of the receiving bands. The subset of the transmitting bands is different in number than the subset of receiving bands.

In another aspect, a method is provided. The method can include transmitting, by a central unit, downlink signals to a first set of remote units. The method can also include transmitting, by the first set of remote units, the downlink signals to a coverage area. The method can further include receiving, at the central unit, uplink signals transmitted by user equipment devices from a second set of remote units. The first set of remote units is different in number from the second set of remote units.

DETAILED DESCRIPTION

Figure 1:
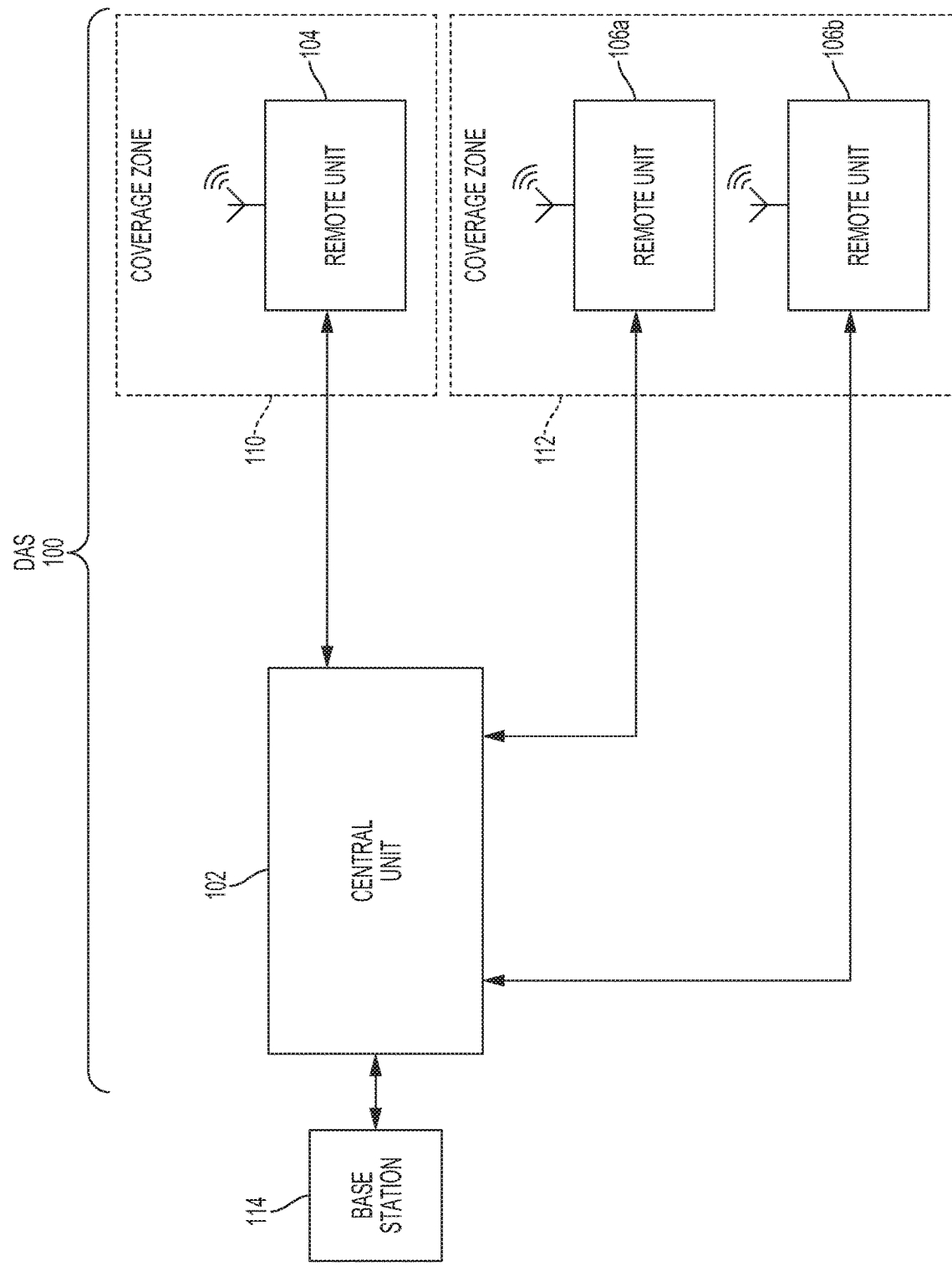
FIG. 1 is a block diagram of an example of a distributed antenna system (DAS) with a central unit and a network of remote units according to one aspect of the present disclosure.

Certain aspects and features of the present disclosure relate to a distributed antenna system (DAS) with an unequal distribution of transmitters and receivers. For example, the DAS can include a number of transmitting remote units, a number of receiving remote units, and a central unit. The number of transmitting remote units can be different from the number of receiving remote units such that the DAS includes an unequal number of transmitters and receivers. Transmitting remote units can be used to transmit downlink wireless communication signals from the central unit to user equipment devices within respective coverage zones of the transmitting remote units. Receiving remote units can be used to receive uplink communication signals transmitted by the user equipment devices. Receiving remote units can transmit the uplink communication signals to the central unit. The central unit can combine the uplink communication signals from the receiving remote units and transmit the combined uplink communication signal to the cellular base station. Transmitting remote units may transmit downlink wireless communication signals but not receive uplink communication signals. Similarly, receiving remote units may receive uplink communication signals but not transmit downlink communication signals.

A DAS with an unequal distribution of transmitters and receivers can also be obtained by allocating carrier frequency bands unequally among remote units that are capable of transmitting and receiving wireless signals. Remote units, which may support multiple frequency bands, may use different combinations of transmission frequency bands or receiver frequency bands.

A DAS having more transmitters than receivers, for example, may provide better signal transmission performance in transmitting signals to the mobile user equipment, allowing for downlink capabilities at higher speeds. A DAS with more transmitters than receivers can also utilize lower-power transmitters, but more transmitters, to minimize heat, power, fan, or audible noise concerns. Further, as high receiver sensitivity can be less important in an indoor, short distance environment, fewer receivers may be used. Alternatively, having fewer, higher-power transmitters may be advantageous in some circumstances by allowing for higher-power transmitters to take advantage of transmitter techniques that are more efficient. Unequal transmitter and receiver distribution in DAS can also spread out receivers to minimize path loss to any particular mobile user equipment. This can allow the mobile user equipment to retain low transmit power, which can improve battery life and decrease interference. Unequal transmitter and receiver distribution in DAS may also help reduce leakage to outside cell sites.

Further, unequal transmitter and receiver distribution in a DAS can allow for allocating different frequency bands to the transmitting remote units and the receiving remote units. In some aspects, different subsets of frequency bands can be allocated as transmission bands and receiver bands unequally among the remote units. In other aspects, allocating different frequency bands can provide different levels of Multiple-Input-Multiple-Output (MIMO) compatibility in the DAS. For example, in a DAS with six transmitting remote units, four of the transmitting remote units can transmit signals in one MIMO band and two of the transmitting remote units can be configured to transmit signals in a second MIMO band.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram depicting an example of a DAS 100 that is designed to transport wireless communication between a base station 114 and user devices positioned in coverage zones 110, 112. The DAS 100 can include a network of spatially separated remote units 104, 106a-b communicatively coupled to a central unit 102 (e.g., a head-end unit or a repeater). The central unit 102 can communicate information, data, and signals between the base station 114 and the remote units 104, 106a-b. The remote units 104, 106a-b can provide signal coverage to user equipment devices located in respective coverage zones 110, 112. In certain aspects and features, remote units 104, 106a-b can be configured as transmitting remote units or receiving remote units so that there is unequal distribution of transmitters and receivers in the DAS 100.

For illustrative purposes, FIG. 1 depicts a DAS 100 that communicates with one base station 114 and that includes a single central unit 102 and three remote units 104, 106a-b serving two coverage zones 110 and 112. A DAS according to various other examples can communicate with any number of base stations and can include any suitable number of central units and remote units. A DAS can also serve any number of coverage zones.

The central unit 102 can receive downlink signals from a base station 114 and transmit uplink signals to the base station 114. Any suitable communication link can be used for communicating between the base station 114 and the central unit 102. For example, a wired link or a wireless link can be used for communication between the base station 114 and the central unit 102. A wired link can include, for example, a cable that is copper, optical fiber, or other suitable communication medium. In some aspects, the central unit 102 can include an external repeater or internal RF transceiver to communicate with the base station 114. In some aspects, the central unit 102 can combine downlink signals received from different base stations 114. The central unit 102 can transmit the combined downlink signals to one or more of the remote units 104, 106a-b.

Remote unit 104, 106a-b can be configured as transceiver remote units that can both transmit and receive signals wirelessly with the central unit 102. Each transceiver remote unit can include both a transmitter and a receiver. When remote units 104, 106a-b are configured as transceiver remote units, unequal transmitter/receiver distribution in the DAS can be obtained by allocating certain transmission frequency bands and receiver transmission bands to the transceiver remote units. In other aspects, each remote unit 104, 106a-b may include either a transmitter or a receiver, but not both. Separating the transmitters and receivers may be achieved by splitting the transmitter/receiver pairs of each transceiver for the remote units 104, 106a-b.

The remote units 104, 106a-b that are configured as transmitting remote units can provide signal coverage in coverage zones 110 and 112 by transmitting downlink signals to user equipment devices. The remote units that are configured as receiving remote units can receive uplink signals from the user equipment devices and transmit the uplink signals to the central unit 102. The central unit 102 can combine uplink signals received from the remote units 104, 106a-b configured as receiving remote units, for transmission to the base station 114.

The remote units 104, 106a-b can be communicatively coupled to the central unit 102 via any suitable digital communication link. For example, a digital communication link can include a 10GBASE-T Ethernet link. In some aspects, the Ethernet link can include a wired link such as copper cabling, optical fiber, or coaxial cable. In additional aspects, the Ethernet link can include a wireless link. Each remote unit 104, 106a-b may be independently coupled to the central unit 102. Or separate transmitters and receivers can be coupled together and to the central unit 102 in a daisy-chain fashion.

A DAS can include varying numbers of transmitting remote units and receiving remote units. Many configurations of unequal receiver and transmitter distribution in the DAS 100 are possible. FIGS. 2 through 9 illustrate various possible configurations for implementing unequal transmitter and receiver distribution in a DAS. Although single antenna or single-input-single-output (SISO) transmitters and receivers are discussed and shown in the diagrams herein, each transmitter or receiver remote unit discussed in the figures below may be a MIMO transmitter or a MIMO receiver having multiple independent transmitters or receivers (with or without multiple antennae). The subject matter described herein may also apply to MIMO configurations and are not limited to SISO installations or approaches.

Figure 2:
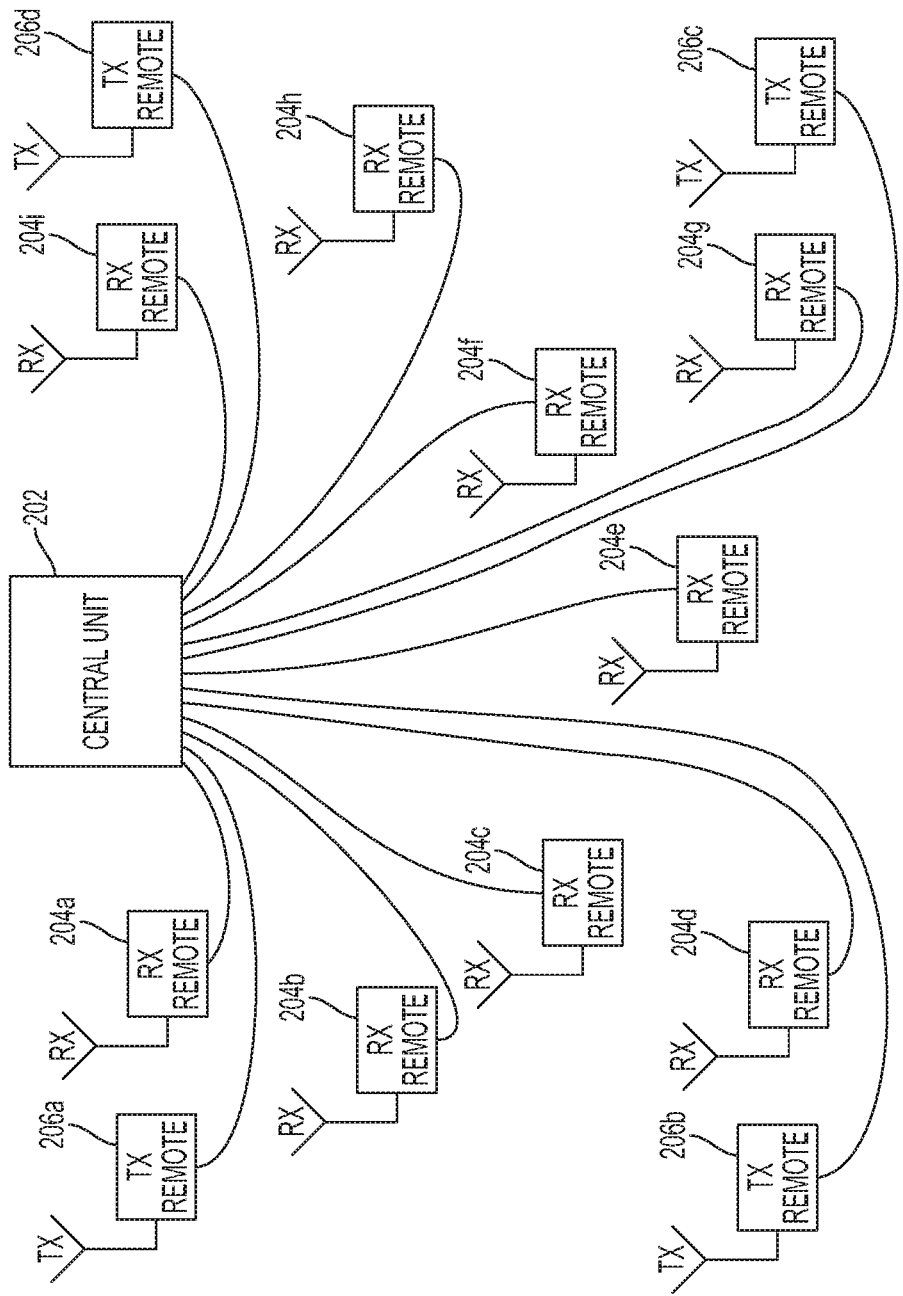
FIG. 2 is a block diagram of an example of a configuration of a DAS with a greater number of receivers than transmitters according to one aspect of the present disclosure.

For example, FIG. 2 is a block diagram of a DAS in which there are more receiving remote units than transmitting remote units. FIG. 1 depicts a central unit 202 communicatively coupled to nine receiving remote units 204a-i and to four transmitting remote units 206a-d. The receiving remote units 204a-i and transmitting remote units 206a-d are separately and directly coupled to the central unit 202. By being separately and directly coupled to the central unit 202, each receiving remote unit 204a-i and transmitting remote unit 206a-d is coupled to the central unit 202 without any intermediate communication device in between the signal path of the respective remote unit and the central unit 202. In other configurations, each receiver remote unit 204a-i and transmitter remote unit 206a-d can be indirectly coupled to the central unit 202. For example, each receiver remote unit 204a-i and each transmitter remote unit 206a-d can be communicatively coupled to the central unit 202 via one or more intermediate communications devices, such as an expansion access node (not shown).

Each receiver remote unit 204a-i and each transmitter remote unit 206a-d can include an antenna component and a circuitry component. The circuitry component and the antenna component can be physically separated and communicatively coupled (e.g., connected via a communications link) or can be integrated or co-located in a shared physical device.

Figure 3:
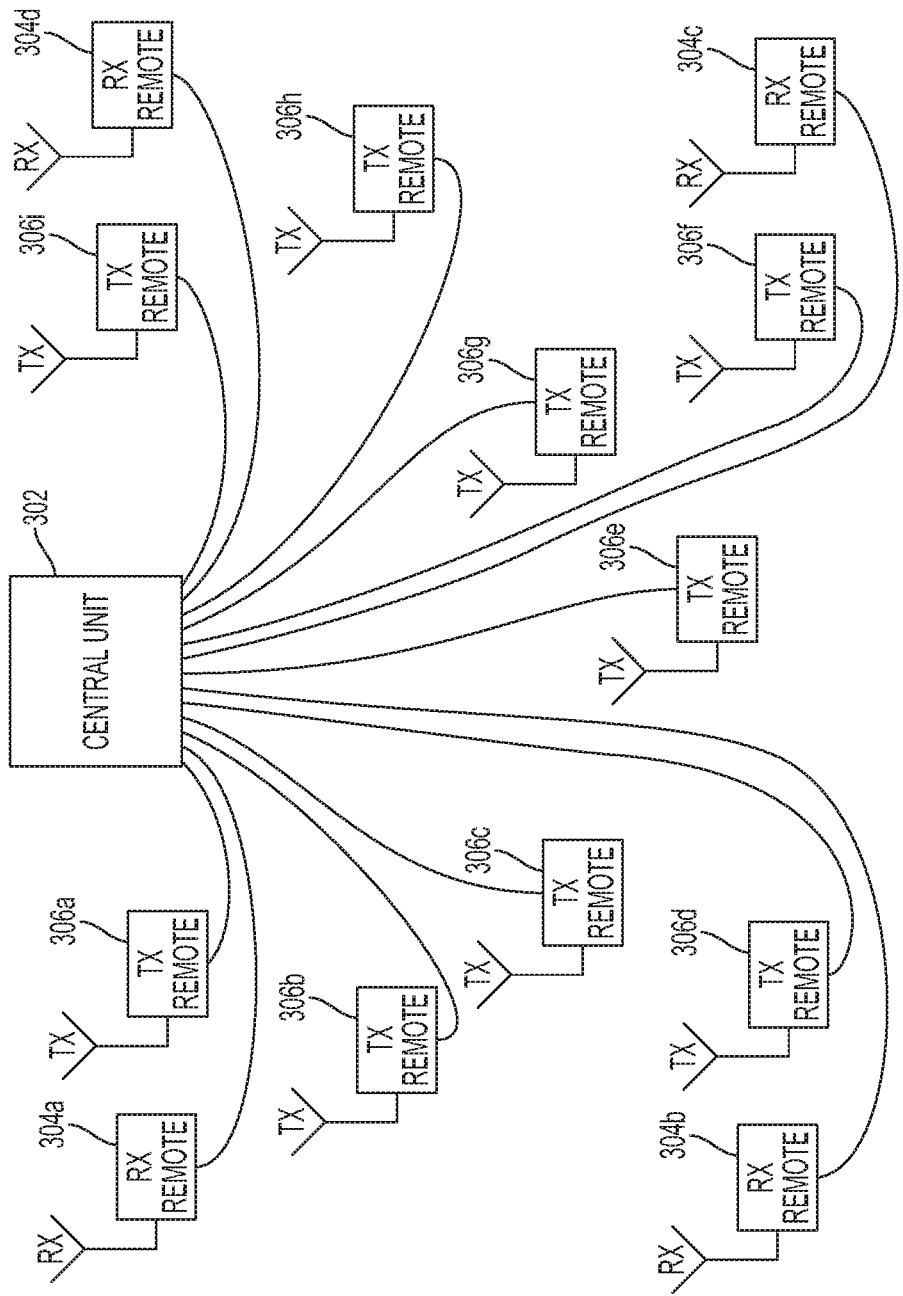
FIG. 3 is a block diagram of an example of a configuration of a DAS with a greater number of transmitters than receivers according to one aspect of the present disclosure.

Similarly, FIG. 3 depicts a block diagram of a DAS having more transmitters than receivers. Specifically, FIG. 3 depicts a central unit 302 communicatively coupled to four receiving remote units 304a-d and nine transmitting remote units 306a-i. Similar to the receiving remote units 204a-i and the transmitting remote units 206a-d shown in FIG. 2, the receiving remote units 304a-d and transmitting remote units 306a-i can be separately and directly coupled to the central unit 302. Separating receivers from transmitters, as shown in FIGS. 2 and 3, may improve signal isolation, allow for improved power output, or allow for more flexibility. Combining receivers and transmitters together can improve ease of installation and reduce system cost.

Figure 4:
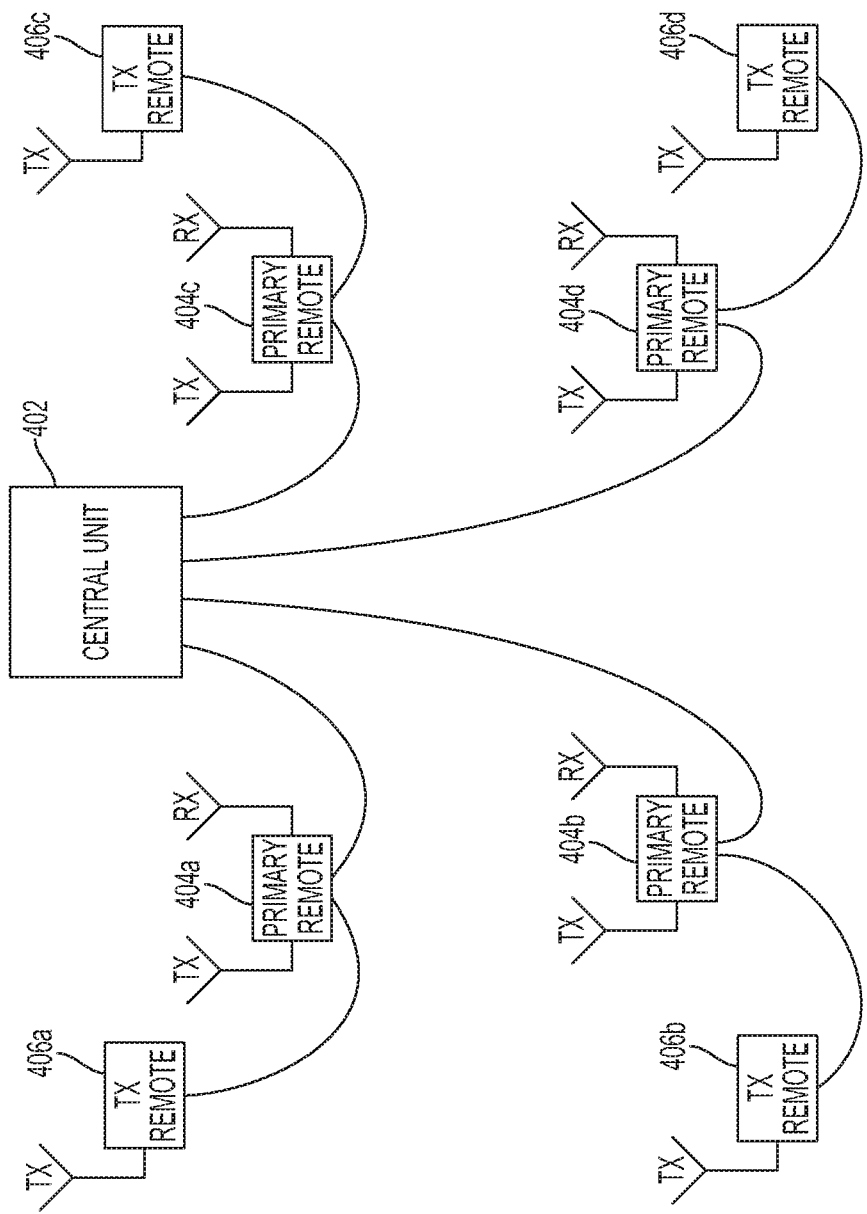
FIG. 4 is a block diagram of an example of a configuration of a DAS with primary remote units and secondary remote units according to one aspect of the present disclosure.

In other configurations, the remote units may be divided into different types. For example, FIG. 4 depicts a block diagram of a central unit 402 communicatively or directly coupled with primary remote units 404a-d. Primary remote units 404a-d may include both a transmitter and receiver and thus operate as both transmitting remote units and receiving remote units. "Secondary" remote units may include just a receiver or just a transmitter and thus operate is either receiving remote units or a transmitting remote units. The primary remote units 404a-d can be communicatively or directly coupled to secondary remote units 406a-d. FIG. 4 depicts a greater number of transmitting remote units than receiving remote units. The secondary remote units 406a-d can utilize the same full signal processing as the primary remote units 404a-d, or the secondary remote units 406a-d can utilize less processing or be controlled and fed from primary remote units 404a-d. The four secondary remote units 406a-d are configured as transmitting remote units. Secondary remote units can also be configured, however, as receiving remote units.

In another configuration, each remote unit may include a single receiver and one or more transmitting remote units coupled in a fixed, non-fixed, or variable radius. In this configuration, a variable number of remote units of a first type (e.g., transmitter or receiver) and a variable number of remote units of a second type (e.g., transmitter or receiver) can form a "cluster," allowing the transmitting and receiving remote units to be coupled to the central units in clusters. The "cluster" formed by the one or more transmitting remote units coupled to each receiving remote unit (or vice versa) may allow for an unequal number of receiving remote units and transmitting remote units in the DAS. Each cluster can include a central, node remote unit that forms the center of a cluster. Each node remote unit can be coupled to both the central unit and to one or more member remote units, which can also be either receiving remote units or transmitting remote units.

Figure 5:
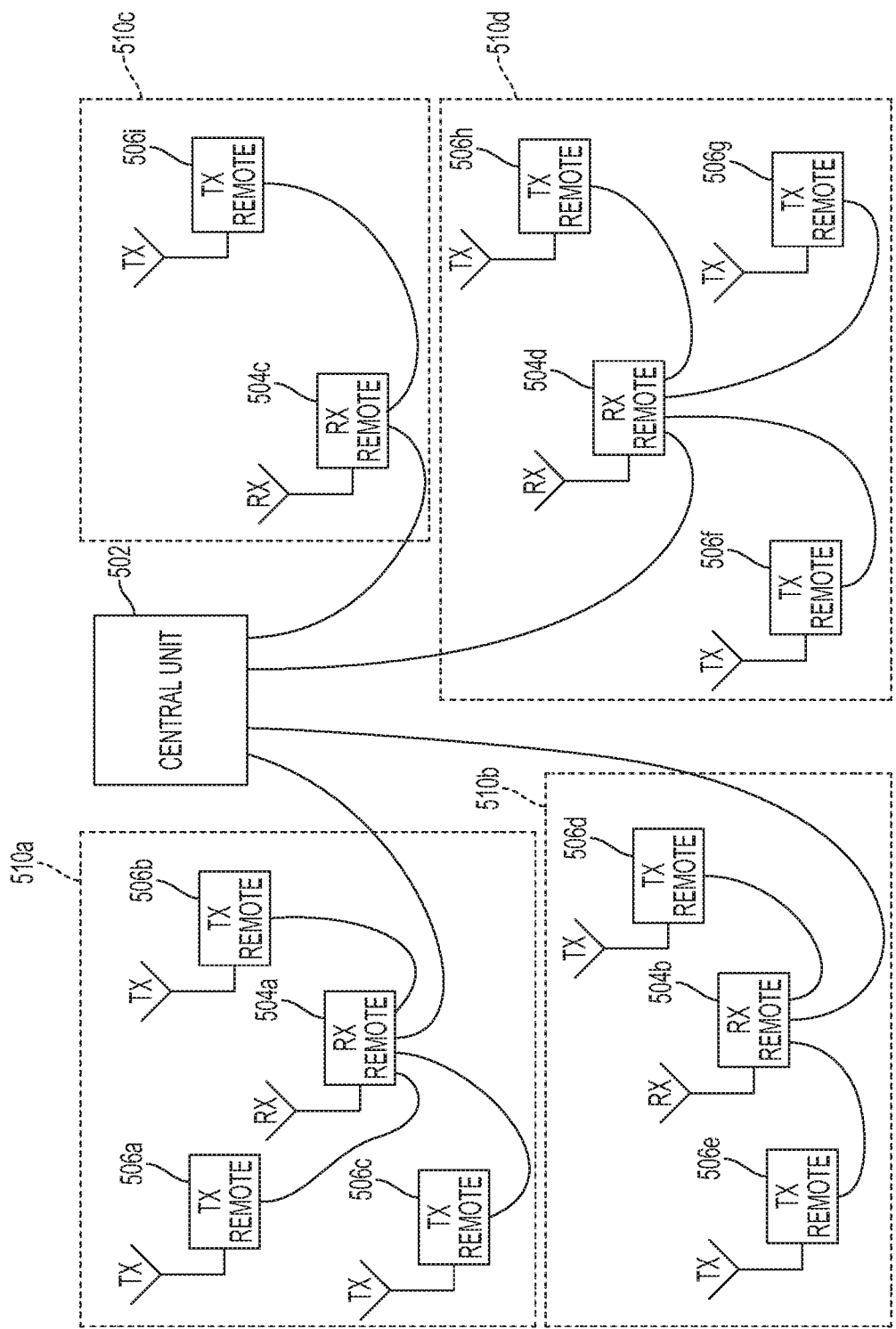
FIG. 5 is a block diagram of an example of a configuration of a DAS with remote units organized in clusters according to one aspect of the present disclosure.

For example, FIG. 5 depicts an example of a configuration of a central unit 502 communicatively or directly coupled with node remote units 504a-d. The four node remote units 504a-d are shown configured as receiving remote units that form the center of the clusters 510a-d, respectively. The four illustrated node remote units 504a-d can further be communicatively or directly coupled to a variable number of member remote units 506a-i. Member remote units 506a-i are configured as transmitting remote units. The member remote units 506a-i of clusters 510a-d are of the opposite type as the node remote units 504a-d (e.g., transmitter member units are coupled to a receiver node remote unit in each cluster). In other aspects, node remote units can be configured as transmitting remote units while member remote units are configured as receiving remote units. The configuration shown in FIG. 5 may simplify installation of the remote units. This configuration can also be implemented using single transmitters with one or multiple receiving remote units.

Figure 6:
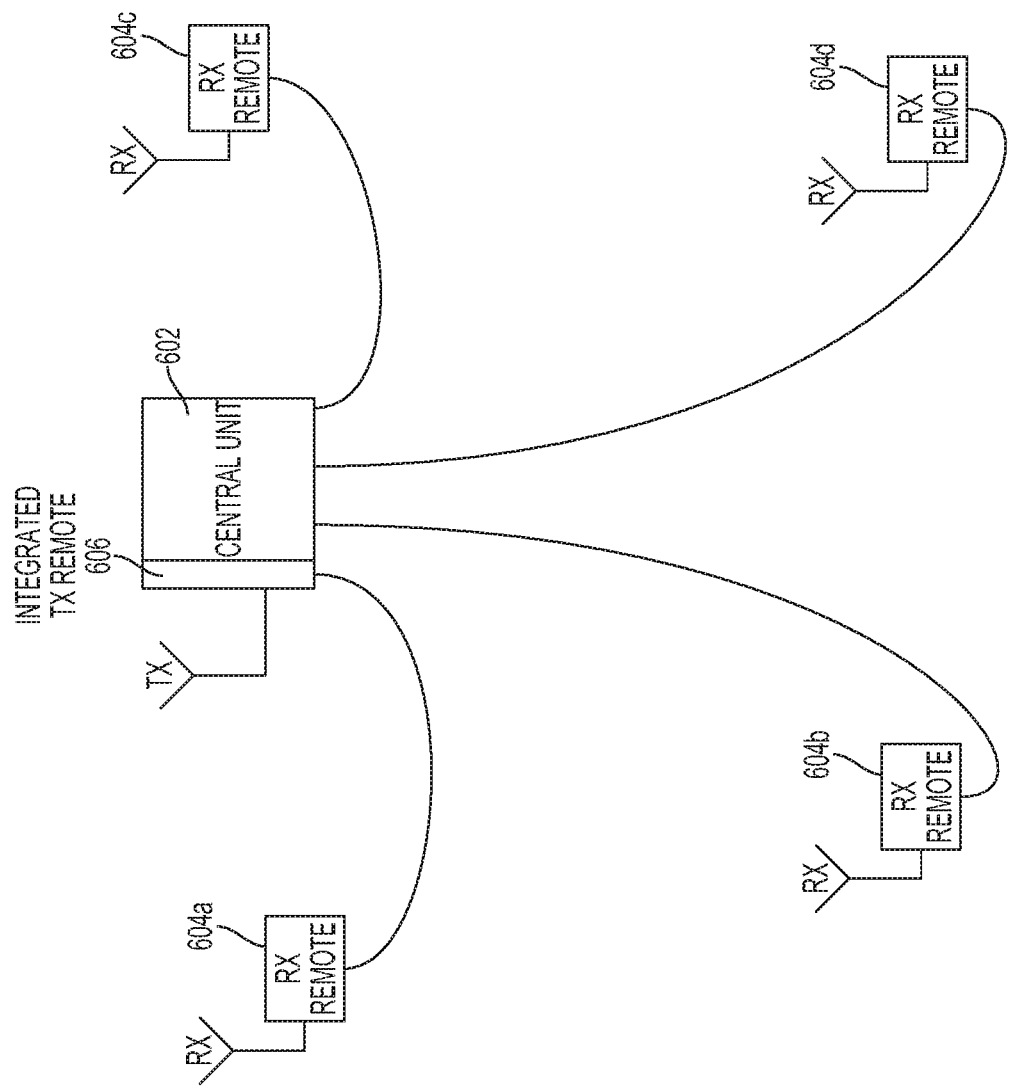
FIG. 6 is a block diagram of an example of a configuration of a DAS with a transmitter remote unit integrated into the circuitry of a central unit according to one aspect of the present disclosure.

In another configuration, the DAS may include a single, centrally located transmitter remote unit for transmitting signals to user equipment. The centrally located transmitter remote unit can be coupled to multiple receiving remote units that are distributed over a coverage area. For example, FIG. 6 depicts a DAS including a central unit 602 with an integrated transmitter remote unit 606. The central unit 602 can be communicatively coupled with multiple receiving remote units 604a-d. While the single transmitter remote unit 606 can be coupled within the circuitry of the central unit 602, the four receiving remote units 604a-d can be remotely located from the central unit 602 and can be each independently coupled to the central unit 602. In such a configuration, the central unit 602 can transmit downlink signals to user equipment devices via the integrated transmitter remote unit 606. Uplink signals from user equipment devices can be received by receiving remote units 604a-d, which can then provide the uplink signals to central unit 602. Central unit 602 can combine the uplink signals from remote units 604a-d and transmit the combined uplink signals to a base station.

While FIG. 6 depicts a centrally located transmitter remote unit 606, the DAS configuration may include a single, centrally located receiver remote unit that is coupled to multiple transmitting remote units. In either configuration, the centrally located remote unit can be integrated into the circuitry of the central unit.

Figure 7:
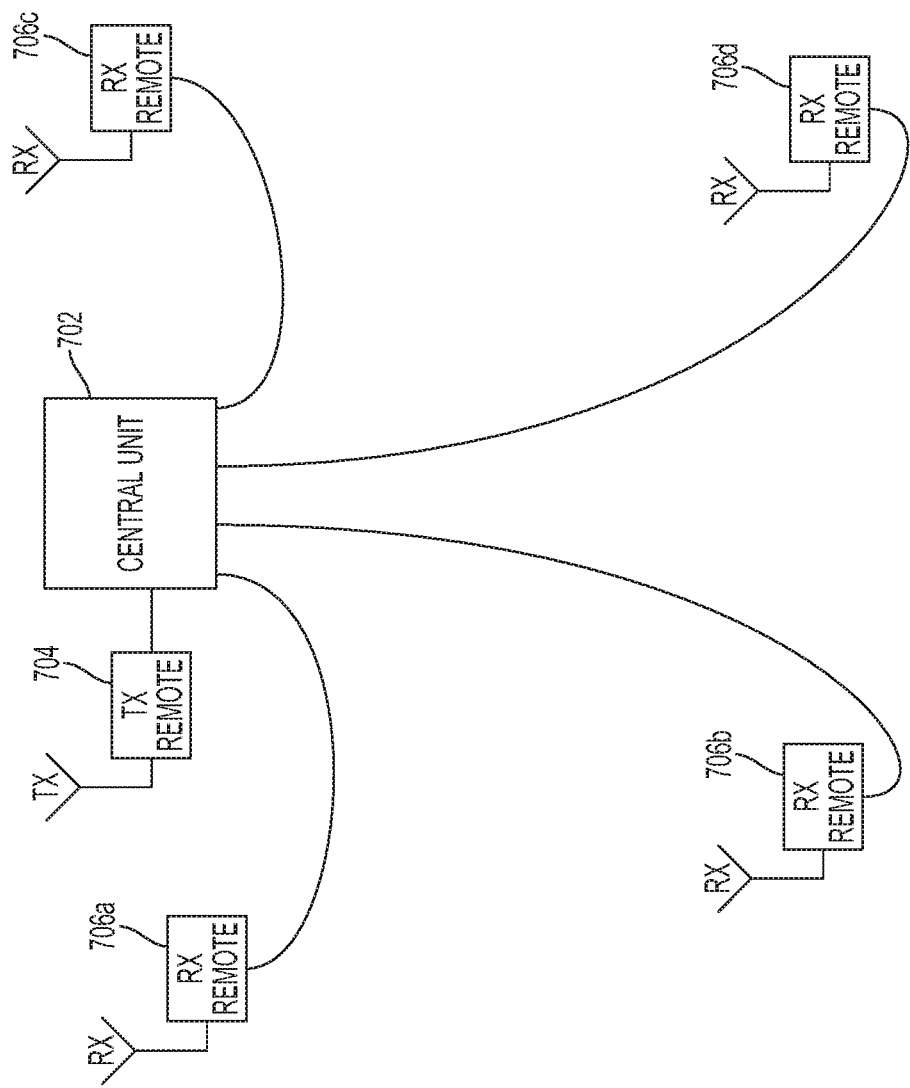
FIG. 7 is a block diagram of an example of a configuration of a DAS with a transmitter remote unit attached to or co-located with a central unit according to one aspect of the present disclosure.

In other aspects, a centrally located remote unit can be attached to or co-located with a central unit without being integrated into the circuitry of the central unit. For example, FIG. 7 depicts a block diagram of a central unit 702 with a single transmitter remote unit 704 that is attached or co-located with the central unit 702. The central unit 702 can provide downlink signals to the transmitter remote unit 704, which can transmit the downlink signals to user equipment devices. Remote units 706a-d can receive uplink wireless signals from the user equipment devices and provide the uplink signals to the central unit 702.

Figure 8:
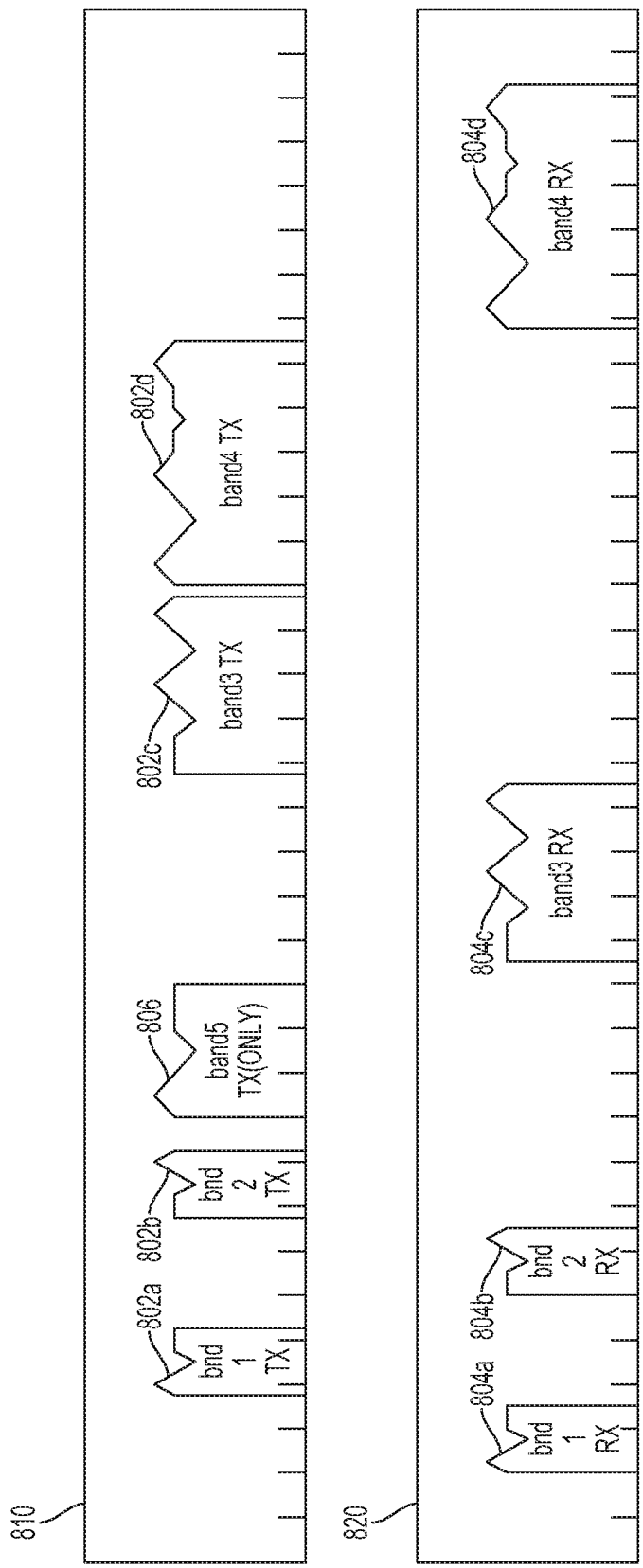
FIG. 8 is a signal diagram of allocating frequency bands as transmission frequency bands and receiver frequency bands according to one aspect of the present disclosure.

Another approach for implementing unequal transmitter and receiver distribution in a DAS is to allocate transmitter and receiver frequency bands unequally among the remote units. The remote units, which may support multiple frequency bands, may also support different configurations of transmitter and receiver bands or sub-bands. For example, FIG. 8 depicts the division of frequency bands in an example of a frequency spectrum that can be used in a DAS. In one example, a frequency spectrum can be divided into different subsets of supported frequency bands for transmission bands and receiver bands. The supported transmission bands of a transmitting remote unit are shown in the upper portion of the diagram 810 and the supported bands of a receiving remote unit are shown in the lower portion of the diagram 820. The subset of supported transmission bands can be different from the subset of receiver bands. FIG. 8 depicts four duplexed receive and transmission bands 804a-d, 802a-d, respectively, plus an additional standalone transmission band 806. The subset of transmission bands 802a-d, 806 are different from the subset of receive bands 804a-d.

The receive and transmission bands 804a-d, 806, 802-a-d supported by the central unit may be distributed for use among the remote units. For example, while all of the remote units may support communicating using all four receive bands 804a-d, the transmitting remote units may communicate subsets of the overall transmission bands 802a-d, 806. Some remote units may communicate using a single transmission band 802, some remote units may communicate using multiple transmission bands 802a-d, and some remote units may share two bands (so that those two bands are supported by two transmitters). For example, one transmitter remote unit may be allocated transmission bands 802a-b, while a second transmitter remote unit may be allocated transmission bands 802c-d.

Figure 9:
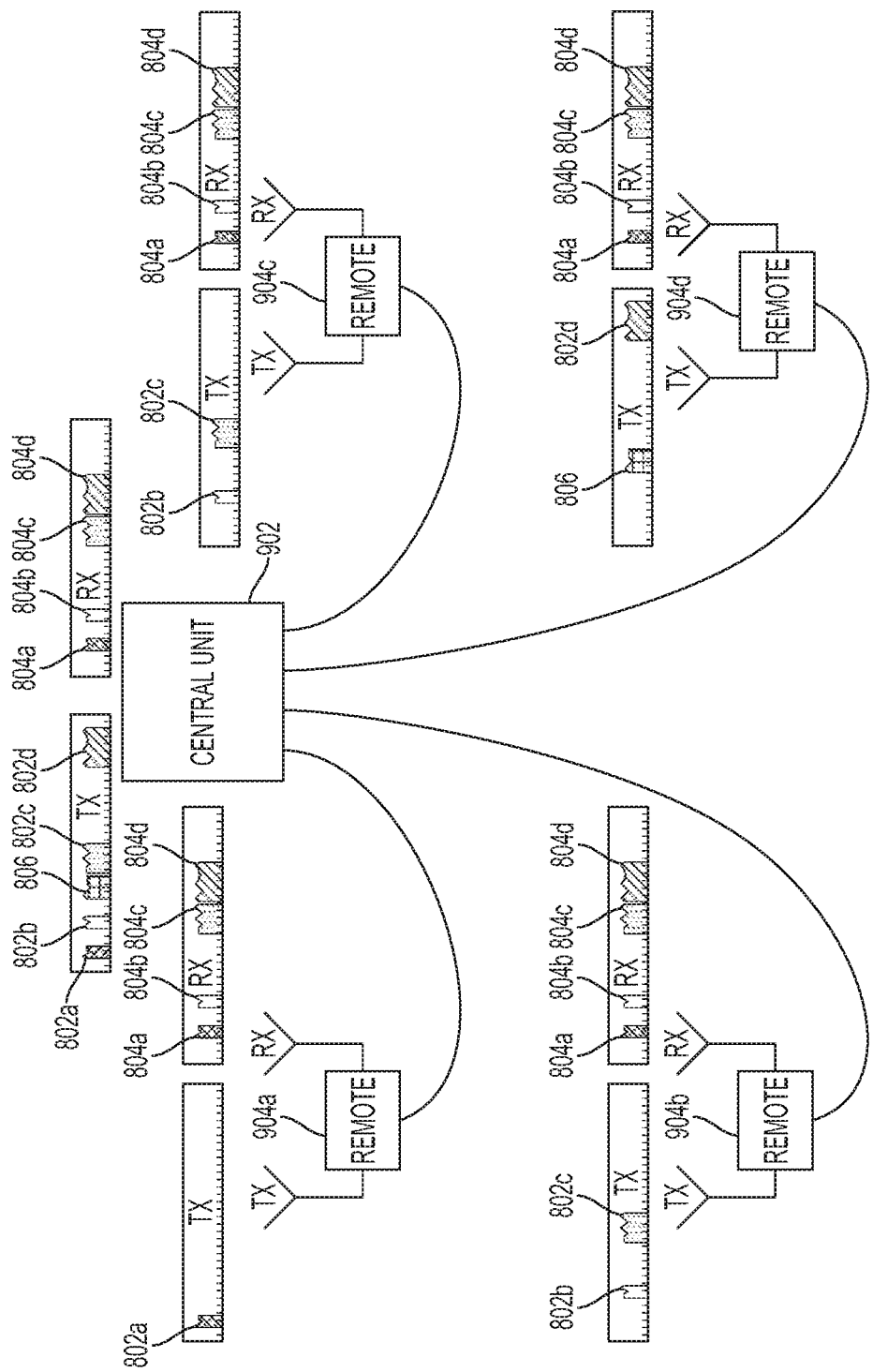
FIG. 9 is a block diagram showing an example of a DAS with remote units allocated the different frequency bands that are shown in FIG. 8 according to one aspect of the present disclosure.

FIG. 9 depicts a block diagram of an example of a DAS with remote units allocated the different frequency bands that are shown in FIG. 8. As shown in FIG. 9, four remote units 904a-d can be coupled to central unit 902. Each of the remote units 904a-d is shown configured as a transmitter and a receiver. The number of bands, rather than the number of antennas or units, may be unequally distributed between receiving and transmitting. For example, remote unit 904a may support transmission band 802a and all four receive bands 804a-d. Remote units 904b, 904c may support transmission bands 802b, 802c and all four receive bands 804a-d. Remote unit 904d may be allocated transmission bands 806, 802d and all four receive bands 804a-d. As shown, transmission bands 802b, 802c can be supported by multiple remote units (e.g., remote units 904b, 904c).

While aspects for unequal allocation of frequency bands were discussed with reference to FIGS. 8 and 9, unequal allocation of frequency bands among remote units can apply to any of the DAS configurations shown in FIGS. 2-7. For example, while the remote units 904a-d shown configured as both transmitters and receivers for illustrative purposes, remote units 904a-d can also be configured as either transmitting remote units or receiving remote units. In such a configuration, the transmitting remote units may utilize the subset of the supported transmission bands and the receiving remote units may utilize the subset of the supported receiver bands. Also, in such a configuration, the subset of transmission bands can be divided among the transmitting remote units. One transmitter remote unit may be allocated transmission bands 802a-b, while a second transmitter remote unit may be allocated transmission bands 806, 802c-d.

Either or both subsets of receiver and transmission bands can be allocated, as desired, to single, multiple, or all remote units. This allocation may be performed based on many different criteria. For example, the allocation of receiver and transmission bands among remote units may be made to take advantage of the different propagation delays inherent in the different frequency bands. The allocation of receiver and transmission bands among remote units may also be made to allocate certain frequency bands where needed depending on user equipment device congestion in a coverage area. Further, the allocation of receiver and transmission bands among remote units may be made to optimize different communication standards being used (e.g., certain frequency bands may carry carrier signals for LTE cellular systems while other frequency bands may carry carrier signals for W-CDMA cellular systems. As another example, the allocation of receiver and transmission bands among remote units may be made to mitigate interference (e.g., from other remote units, from other internal systems/networks, or from outside systems).

The allocation of receiver and transmission bands among remote units may also be made to better contain the DAS-communicating user equipment devices within the network. For example, if an external base station not connected and outside the coverage area for the DAS is particularly strong in one area, the external base station may transmit signals that interfere with signals used within the DAS. The receiver and transmission bands can be allocated to mitigate interference with the external signals. This allocation can be standardized, optimized at installation, or reviewed based on performance, usage, or other statistics, or automatically adjusted based on performance, usage, or other statistics.

Another possible advantage of unequal allocation of transmitters and receivers, in some examples, is the ability to provide different levels of MIMO capability. For example, a DAS configured in one MIMO format can include four downlink transmitters and two uplink receivers. In another example, a multi-band system can include a dynamic MIMO configuration. A dynamic MIMO configuration can include, for example, a scenario in which six downlink transmitters are initially available to serve two downlink MIMO bands. At another time, four of the six downlink transmitters can be allocated to transmit signals in transmission band A while the remaining two transmitters can be allocated to transmit signals in transmission band B. At yet another time, two of the four transmitters allocated to transmission band A can be reassigned from transmission band A to transmission band B, thus providing four transmitters configured to transmit signals in transmission band B. Dynamically reassigning or reallocating transmitters and receivers to transmit in different bands can be performed on an entire band or on individual channels within a band.

Figure 10:
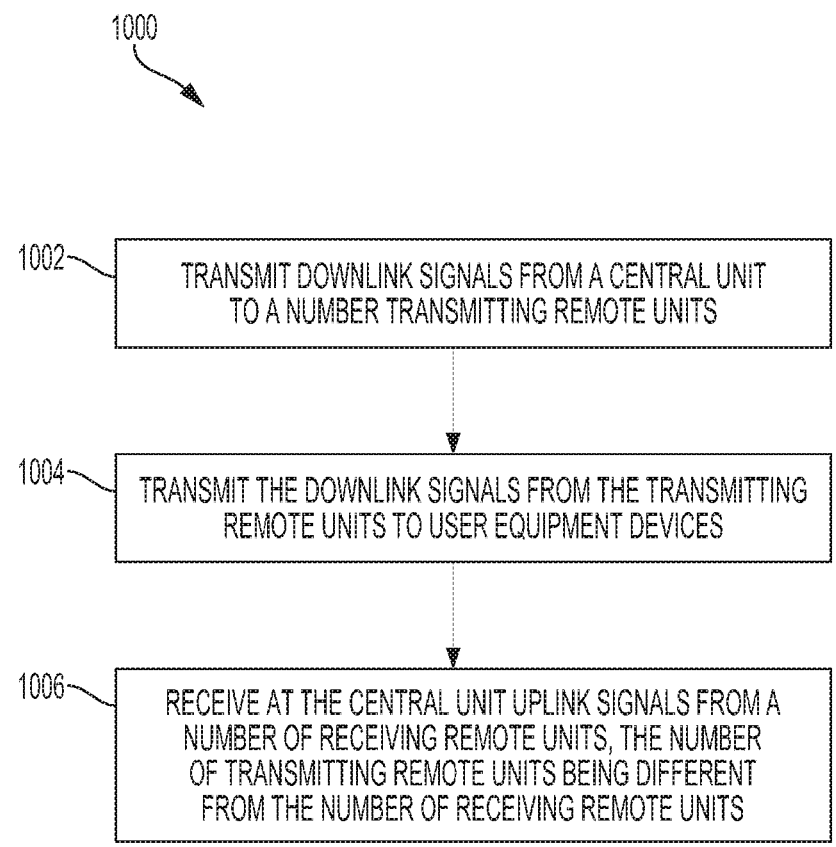
FIG. 10 is a flowchart depicting an example of a process for communicating signals in a DAS with an unequal distribution of transmitters and receivers according to one aspect of the present disclosure.

FIG. 10 is a flowchart depicting an example of a process 1000 for communicating signals in a DAS with unequal receiver and transmitter distribution. The process 1000 is described herein with reference to FIG. 2, but other configurations are possible. A central unit 202 can transmit downlink signals to a number of transmitting remote units, 206*a-i*, as shown in block 1002. Further, each of the transmitting remote units 206*a-i* can be allocated a subset of frequency bands as transmission frequencies. For example, as discussed above with respect to FIGS. 8 and 9, the transmission frequencies can be split and allocated among the transmitting remote units 206*a-i* (e.g., transmitting remote units 206*a-c* may be allocated transmission bands 802*a-b* and transmitting remote units 206*d-i* may be allocated transmission frequencies 802*c-d*).

In response to receiving downlink frequencies from the central unit 202, transmitting remote units 206*a-i* can transmit the downlink signals to user equipment devices, as shown in block 1004. Each of the transmitting remote units 206*a-i* can transmit downlink signals, for example, to user equipment devices located within a respective coverage zone.

In block 1006, the central unit 202 can receive uplink signals transmitted by the user equipment devices from a number of receiving remote units 204*a-d*. To achieve unequal transmitter/receiver distribution in the DAS, the number of receiving remote units 204*a-d* may be different from the number of transmitting remote units 206*a-i*. In response to receiving the uplink signals from the receiving remote units 204*a-d*, the central unit 202 may combine the received uplink signals and transmit the combined uplink signal to a base station.

Transmitting remote units and receiving remote units can include various types of circuitry or components. For example, the transmitting remote units and receiving remote units can include signal processing circuitry for manipulating signals provided between the central unit 102 and user equipment devices. A remote unit configured as a transmitting remote unit can include baseband and signal processing circuitry dedicated to processing downlink communication signals from the central unit 102 for transmission to user equipment devices. Similarly, a remote unit configured as a receiving remote unit can include baseband and signal processing circuitry dedicated to processing uplink communication signals from user equipment devices for transmission to the central unit 102. In other examples the remote units do not include circuitry for performing baseband processing. In other examples, the remote units do not include circuitry for performing digital processing.

Figure 11:
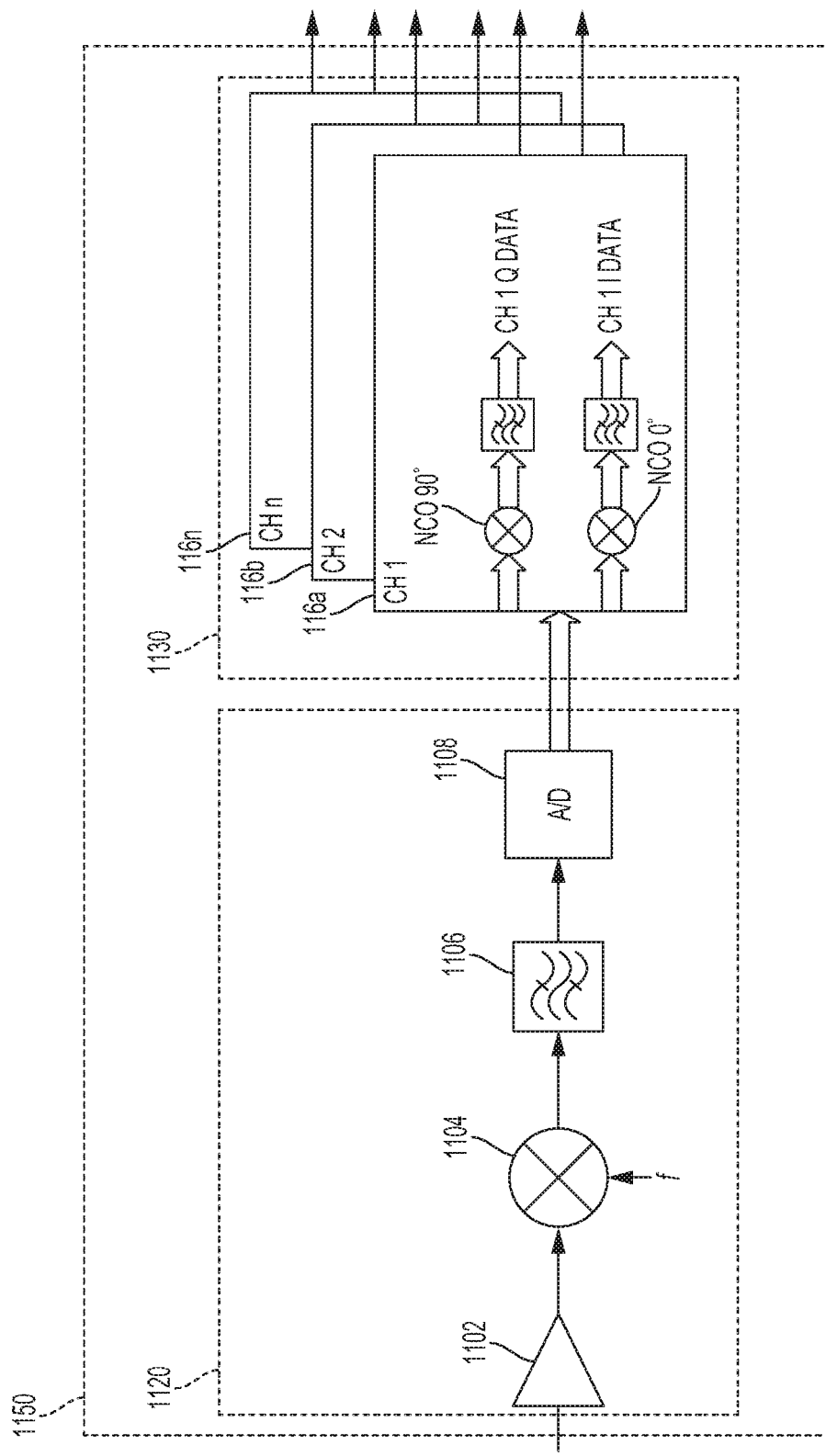
FIG. 11 is a schematic diagram depicting an example of a remote unit configured as a receiving remote unit according to one aspect of the present disclosure.
Figure 12:
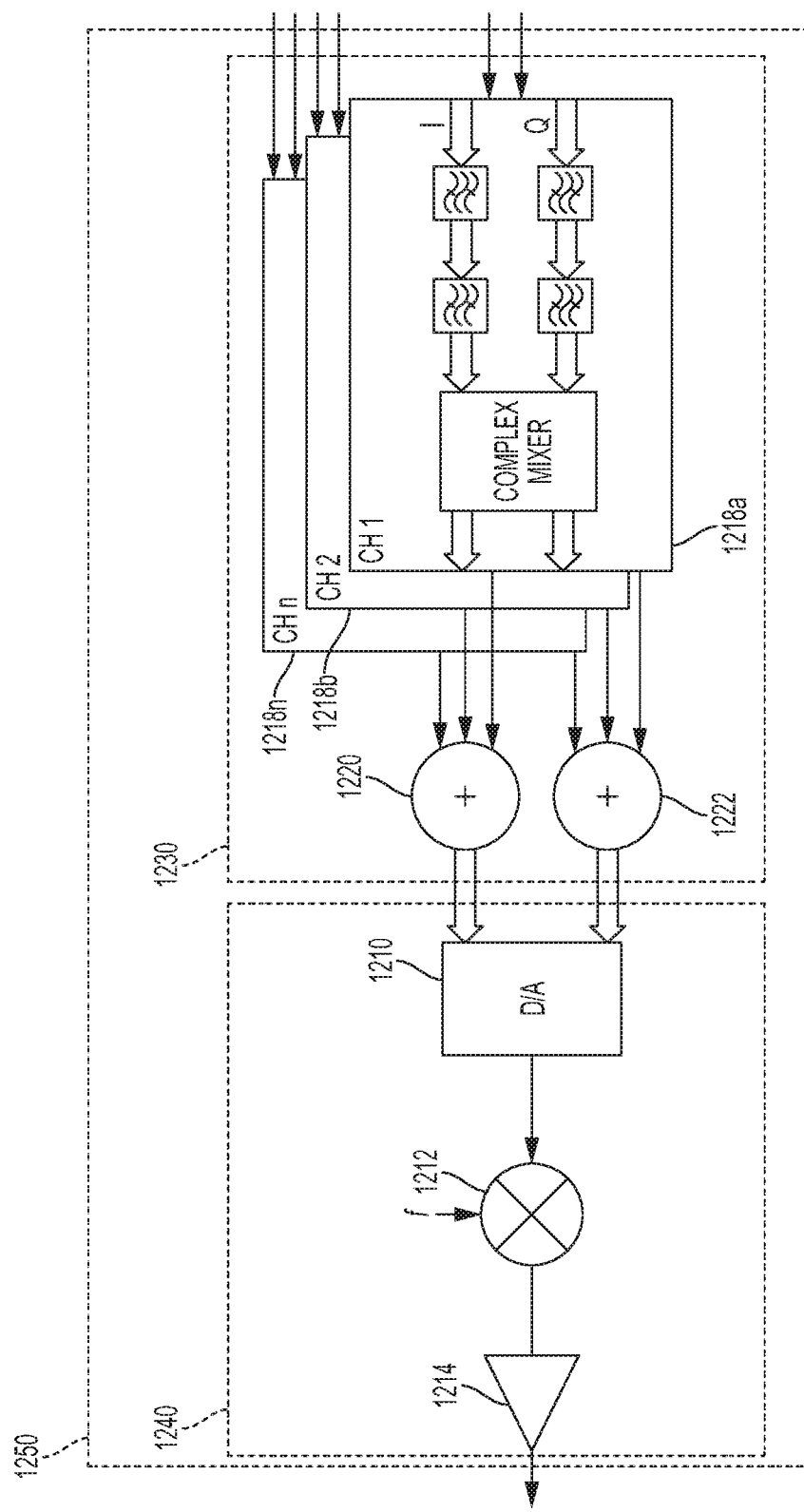
FIG. 12 is a schematic block diagram depicting an example of a remote unit configured as a transmitting remote unit according to one aspect of the present disclosure.

FIG. 11 depicts an example of circuitry or components that can be included in a receiver remote unit 1150 and FIG. 12 depicts an example of circuitry or components that can be included in a transmitting remote unit 1250, but other configurations are possible.

The receiving remote unit 1150 can include a signal processing section 1120 with an input amplifier 1102, a down-converting mixer 1104, a bandpass filter 1106, and an analog-to-digital (A/D) converter 1108. The input amplifier 1102 can amplify the uplink RF bands received from mobile devices in a coverage area. The RF bands may carry communication information for cellular carriers. The down-converting mixer 1104 can down-convert the RF bands to an intermediate frequency using a mixing frequency f. The bandpass filter 1106 can filter the RF bands at the intermediate frequency. The A/D converter 1108 can convert the filtered RF bands at the intermediate frequency according to a selected sample rate to digital signals.

The receiving remote unit 1150 can also include a channelizer section 1130 that includes down-converting channel modules 1116*a-n*. Each of the down-converting channel modules 1116*a-n* can correspond to a particular communication channel included in the uplink communications signals of the uplink RF bands. The down-converting channel modules 1116*a-n* can demodulate the digital signals received from the A/D converter 1108 to I/Q samples using I and Q mixers and numerically controlled oscillators (NCOs). The I/Q outputs of the down-converting channel modules 1116*a-n* can be digital signals sampled at a certain sample rate. In an example of a receiving remote unit 1150 including seven active channels, seven sets of I and Q data streams can be multiplexed and transmitted to the central unit.

The transmitting remote unit 1250 of FIG. 12 can include a channelizer section 1230 with up-converting channel modules 1218*a-n* and summers 1220-1222. Each up-converting channel module 1218*a-n* can be associated with a particular communication channel included in downlink digital communication signals received from the central unit. The up-converting channel modules 1218*a-n* can filter and interpolate the received downlink communication signals per channel to digital signals using channel filters, up sample lowpass filters, and complex mixers. The summers 1220, 1222 can add the outputs of the up-converting channel modules 1218*a-n* and provide the summed digital downlink signals to a signal processing section 1240.

The signal processing section 1240 can include a digital-to-analog converter (D/A converter) 1210, an up-converting mixer 1212, and an output amplifier 1214. The D/A converter 1210 can convert the digital downlink signals to an analog RF signal at an intermediate frequency. The up-converting mixer 1212 can up-convert the analog RF signal at the intermediate frequency to an RF signal using a mixing frequency, which may be the same as or different from the mixing frequency used by the down-converting mixer 1104. The output amplifier 1214 can amplify the up-converted RF signal for output as an RF band to one or more mobile devices in a coverage area.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A distributed antenna system, comprising:
a central unit communicatively coupled to a first base station and a second base station, wherein the central unit is configured to receive downlink signals from the first base station and the second base station, wherein the central unit is configured to support one or more transmissions bands;
a first remote unit configured to transmit wireless signals in a coverage area, wherein the first remote unit is communicatively coupled to the central unit and located remotely from the central unit;
a second remote unit configured to transmit wireless signals in the coverage area, wherein the second remote unit is communicatively coupled to the central unit and located remotely from the central unit;
wherein the central unit is configured to provide the downlink signals from the first base station and the second base station to the first remote unit and the second remote unit;
wherein the first remote unit and the second remote unit are configured to transmit the downlink signals received from the first base station and the second base station to a user equipment device using the one or more transmission bands.

2. The distributed antenna system of claim 1, wherein the first remote unit and the second remote unit are configured to transmit the downlink signals received from the first base station and the second base station to the user equipment device using a same transmission band.

3. The distributed antenna system of claim 1, wherein the first remote unit and the second remote unit are configured to transmit the downlink signals received from the first base station and the second base station to the user equipment device using a first Multiple-Input-Multiple-Output (MIMO) band.

4. The distributed antenna system of claim 3, wherein the central unit is configured to provide the downlink signals from the first base station to the first remote unit, wherein the first remote unit is configured to transmit the downlink signals received from the first base station to the user equipment device; and
wherein the central unit is configured to provide the downlink signals from the second base station to the second remote unit, wherein the second remote unit is configured to transmit the downlink signals received from the second base station to the user equipment device.

5. The distributed antenna system of claim 3, wherein the distributed antenna system further comprises:
a third remote unit configured to transmit wireless signals in the coverage area, wherein the third remote unit is communicatively coupled to the central unit and located remotely from the central unit; and
a fourth remote unit configured to transmit wireless signals in the coverage area, wherein the fourth remote unit is communicatively coupled to the central unit and located remotely from the central unit;
wherein the central unit is configured to provide the downlink signals from the first base station and the second base station to the third remote unit and the fourth remote unit;
wherein the third remote unit and the fourth remote unit are each configured to transmit the downlink signals received from the first base station and the second base station to the user equipment device using a second MIMO band different than the first MIMO band.

6. The distributed antenna system of claim 5, wherein the distributed antenna system is configured to dynamically reassign the third remote unit and the fourth remote unit to transmit wireless signals in the first MIMO band or the second MIMO band.

7. The distributed antenna system of claim 1, wherein the distributed antenna system further comprises:
a third remote unit configured to receive wireless signals from the coverage area, wherein the third remote unit is communicatively coupled to the central unit and located remotely from the central unit; and
a fourth remote unit configured to receive wireless signals from the coverage area, wherein the fourth remote unit is communicatively coupled to the central unit and located remotely from the central unit;
wherein the third remote unit and the fourth remote unit are configured to receive uplink signals associated with the first base station and the second base station from the user equipment device and provide the received uplink signals to the central unit;
wherein the central unit is further configured to provide the uplink signals received from the first remote unit and the second remote unit to the first base station and the second base station.

8. A distributed antenna system, comprising:
a central unit communicatively coupled to a first base station, wherein the central unit is configured to receive downlink signals from the first base station, wherein the central unit is configured to support transmission using a first frequency band and a second frequency band; and
a first remote unit configured to transmit wireless signals in a coverage area, wherein the first remote unit is communicatively coupled to the central unit and located remotely from the central unit;
wherein the central unit is configured to provide the downlink signals from the first base station to the first remote unit;
wherein the first remote unit is configured to transmit the downlink signals received from the first base station to a user equipment device using the first frequency band and the second frequency band.

9. The distributed antenna system of claim 8, wherein the first frequency band and the second frequency band are each a sub-band of a first transmission band.

10. The distributed antenna system of claim 8, wherein the first frequency band is a sub-band of a first transmission band, wherein the second frequency band is a sub-band of a second transmission band different from the first transmission band.

11. The distributed antenna system of claim 10, further comprising:
a second remote unit configured to transmit wireless signals in the coverage area, wherein the second remote unit is communicatively coupled to the central unit and located remotely from the central unit;
wherein the central unit is further configured to provide the downlink signals from the first base station to the second remote unit;
wherein the second remote unit is configured to transmit the downlink signals received from the first base station to the user equipment device using a third frequency band.

12. The distributed antenna system of claim 11, wherein the third frequency band is either a sub-band of the first transmission band or the second transmission band.

13. The distributed antenna system of claim 11, wherein the third frequency band is a sub-band of a third transmission band that is different from the first transmission band and the second transmission band.

14. The distributed antenna system of claim 8, further comprising:
a second remote unit configured to receive wireless signals from the coverage area, wherein the second remote unit is communicatively coupled to the central unit and located remotely from the central unit;
wherein the second remote unit is configured to receive uplink signals from the user equipment device using a third frequency band and a fourth frequency band and provide the received uplink signals to the central unit;
wherein the central unit is further configured to provide the uplink signals received from the second remote unit to the first base station.

* * * * *